United States Patent
Banerjee et al.

(10) Patent No.: US 9,880,757 B1
(45) Date of Patent: Jan. 30, 2018

(54) COPY DATA MANAGEMENT WITH DATA SECURITY

(71) Applicant: Symantec Corporation, Mountain View, CA (US)

(72) Inventors: Deb Banerjee, Cupertino, CA (US); Steven A. Vranyes, North Oaks, MN (US)

(73) Assignee: Symantec Corporation, Mountain View, CA (US)

( * ) Notice: Subject to any disclaimer, the term of this patent is extended or adjusted under 35 U.S.C. 154(b) by 51 days.

(21) Appl. No.: 14/666,137

(22) Filed: Mar. 23, 2015

(51) Int. Cl.
| G06F 12/00 | (2006.01) |
| G06F 13/00 | (2006.01) |
| G06F 13/28 | (2006.01) |
| G06F 3/06  | (2006.01) |
| G06F 12/14 | (2006.01) |

(52) U.S. Cl.
CPC ............ G06F 3/0619 (2013.01); G06F 3/065 (2013.01); G06F 3/067 (2013.01); G06F 12/14 (2013.01)

(58) Field of Classification Search
CPC ................................. G06F 3/0619; G06F 12/14
USPC ........................................................ 711/162
See application file for complete search history.

(56) References Cited

U.S. PATENT DOCUMENTS

| 8,788,769 | B2  |   | 7/2014  | Abercrombie et al. |
| 2002/0143923 | A1 | * | 10/2002 | Alexander .............. H04L 29/06 709/223 |
| 2006/0200664 | A1 | * | 9/2006  | Whitehead .......... G06F 21/6209 713/165 |
| 2006/0242685 | A1 | * | 10/2006 | Heard .................... G06F 21/577 726/3 |
| 2009/0222914 | A1 | * | 9/2009  | Ozawa .................. G06F 21/608 726/21 |
| 2009/0276474 | A1 | * | 11/2009 | Sela ................... G06F 17/30218 |
| 2010/0274714 | A1 | * | 10/2010 | Sims ................. G06F 17/30017 705/40 |
| 2013/0268357 | A1 | * | 10/2013 | Heath ..................... H04L 63/00 705/14.53 |

* cited by examiner

*Primary Examiner* — Charles Rones
*Assistant Examiner* — Sidney Li
(74) *Attorney, Agent, or Firm* — FisherBroyles LLP

(57) ABSTRACT

The present disclosure provides systems and methods for automatically provisioning the security profile for production data to copy data. In some instances the security provisioning for the copy data is made at the time the production data is copied. In other instances, the security provisioning occurs in a secondary application using the copy data.

20 Claims, 7 Drawing Sheets

COPY DATA MANAGEMENT WITH DATA SECURITY

BACKGROUND

Field

The present disclosure generally relates to copy data management, and in particular to ensuring production data security profiles are maintained and extended per regulation and/or IT information security policy for copy data application.

Description of the Related Art

Applications that provide business services depend on the integrity of their production data, also known as primary data and live data, throughout its lifecycle. For the purpose of this disclosure, production data, primary data and live data are collectively referred to herein as "production data." As the use of business services applications continues to grow within an enterprise, production data from business service applications is being used more and more within the enterprise beyond the original business service application from which the production data was initially associated. However, to use production data in other business service applications, relative to the original business service application to which the production data is associated, copies of the production data are made and used by the other applications.

FIG. 1 shows a business service application as a primary application 20 with production data storage 22 storing production data associated with the business service application. In today's enterprise computing environment, there are other applications that need access to the production data. However, to maintain the integrity of the production data such applications are provided a copy of the production data, which is known as copy data. FIG. 1 also shows a typical set of secondary applications where the production data of the business service application could be used in an enterprise. As shown, the production data is copied for backup and disaster recovery applications 24, copied for use by business intelligence applications 26, copied for use in test and development environments (e.g., data science applications) 28, and copied for archiving and audit purposes 30. Copying the production data for backup and disaster recovery guards against corruption of the production data storage 20 through hardware or software failure or through human error, and enables the retrieval of the production data in the event of disaster associated with the primary computing environment. Typically, backups may be made daily or weekly to local disk or tape, and the backup data may then be moved on a less frequent basis to a remote physically secure archive. Concurrent development and test of new or improved applications based on the same production data requires a development team to have access to another copy of the production data. Such a snapshot might be made weekly depending on development schedules. Compliance with regulatory standards or with internal corporate policies may require that a copy of all or a portion of the production data be retained for future access, usually years, in a long-term archiving system. Business intelligence applications intended to perform services on the production data are supplied with a copy of the production data for such applications.

As is readily apparent, each use of the production data beyond the original business service application necessitates a copy of that production data in some form, e.g., an actual copy or a logical copy. Copying the production data for secondary application use over time expands the number of copies in use in an enterprise. Such expansion is known as copy data sprawl. FIG. 2 provides a visual representation of copy data sprawl, where business service applications 1-Z and associated copy data are interconnected such that copy data for business service application 1 can be used by business service applications 2-Z, and copy data for business service application 2 can be used by business service applications 1 and 3-Z, and copy data for business service application 3 can be used by business service applications 1, 2 and 4-Z, etc. As is readily apparent, the number of copies of the production data for each business service application can grow rapidly in an enterprise.

As a further illustration of the copy data sprawl problem, a sales service application (as a primary business service application) that manages product order flow for an enterprise will collect data on each sales transaction, such as items sold, quantities, and purchase prices, which is stored as sales data in a production database. However, other groups within the enterprise, e.g., marketing, may want to analyze the production sales data, and will need to access the production sales data in order to conduct such analysis. To maintain the integrity of the production sales data, a copy (e.g., physical or logical copy) will be generated for the marketing team to conduct its analysis, and this copy is known as copy data. The marketing team may alter the copy data, add to the copy data or delete some of the copy data in order for the secondary application to perform its analysis. This process can apply to any other organizations within an enterprise, such that over time one can see how copy data sprawl happens.

A further problem associated with copy data sprawl is that many organizations within an enterprise typically work off the copy data for its own business services (i.e., for a secondary business service relative to the primary business service from which the production data is based). This often leads to the creation of copy data that is out of date relative to the production data which is dynamic in nature. Out of date data could lead to decisions being made based upon old data. Further, in some instances the production data may consists of a very large data set. As a result, creating numerous copies of large datasets wastes a lot of expensive storage space, wastes computer processing power, and creates a computing environment with bandwidth issues.

It should be noted that if a copy data management system is deployed in an enterprise computing environment, the objective of such systems is to reduce the number of physical copies of the production data that are made and distributed within the enterprise. To achieve this objective, the copy data management system presents to users logical copies of the production data. The number of physical copies of production data that are permitted by the copy data management system are defined by configuration set up and enterprise administrator choice. One area lacking in current copy data management systems is the inclusion of a security envelope for the copy data. In today's distributed computing environments with physical computing machines and storage, and virtual computing machines and virtual storage, production data from one or more business service applications may reside in any number of locations and computing environments which may not have the same security provisioning as the computing environment supporting the production data. Yet, enterprises have to consider imposing security controls on copy data to protect the copy data from exposure to potential security breaches, or otherwise protect or control the copy data. Currently, when production data is copied, the security profile for that production data does not automatically pass to the computing environment using the copy data or to the copy data. One can readily appreciate with copy data sprawl, such security concerns can expand quickly.

Based upon the above described and other concerns, companies, governments and other large institutions are looking for ways to securely manage copy data.

SUMMARY

The next evolution of copy data management is contemplated by the present disclosure. The present disclosure provides systems and methods for automatically maintaining the security profile (also called "security envelope") for the production data by automatically provisioning the security profile or envelope for the production data to secondary applications using the copy data, or by automatically provisioning the security profile directly into the copy data, or by automatically provisioning the security profile to the computing environments running the secondary applications, or by any combination of the above note security provisioning processes.

In some instances the security provisioning for the copy data is made at the time the production data is copied. For example, for data protection, it may be that in certain applications, e.g., a healthcare application, regulations may require that access to certain fields and records in the copy data needs to be controlled, and so at the time of creating the copy data, the information that cannot be accessed would be omitted or tokenized. There may be other instances where the security provisioning will occur in the secondary application. The copy data may be based off a logical copy of a back-up of the production data (also referred to as copy data). In such instances, when you run the secondary application, the secondary application is provided a logical version of the copy data and security provisioning of the copy data application is automated with the use of server based security controls and network based security controls. This is in additional to field level and record level tokenization and end-user access controls. There may be other instances where the computing environment running the secondary application is provisioned with a security profile equivalent to that of the production data.

The present application also discloses a method for automating security provisioning for copy data. In an exemplary embodiment, the method includes determining production data to be used for a secondary application, sequentially comparing at least one rule in a rules engine to security metadata associated with the production data in an information fabric to determine if a trigger event exists for each of the at least one rules, and in response to a trigger event implementing an action set forth in the rule. The security metadata may be related to the production data, a computing environment running the production data, the copy data or the computing environment running the copy data. For example, in some embodiments the metadata relates to a positioning of the secondary application using the copy data, such as whether the positioning of the secondary application is private facing or public facing. The security metadata may relate to the diversity associated with the secondary application, or the organization within an enterprise responsible for the secondary application using the copy data. Actions that may be implemented include, for example, initiating the installation of security software in a computing system running the secondary business services application, initiating the setting of security policies in security software running in the secondary business service application, initiating the setting of security policies into the copy data, or initiating the setting of security policies in the computing system running the secondary business services application.

The present disclosure also provides a system having one or more sources of production data and one or more sources of copy data, used for automating security provisioning for copy data. In some embodiments, the system includes an information fabric containing security metadata associated with the production data, at least one primary business service application using the production data, at least one computing environment running the primary business service application, at least one secondary business service application to use the copy data, and at least one computing environment running the secondary business service application, and an orchestration system capable of determining production data to be used for a secondary application, sequentially comparing at least one rule in a rules engine to security metadata associated with the production data in the information fabric to determine if a trigger event exists for each of the at least one rules, and in response to a trigger event implement an action set forth in the rule relative to the at least one secondary business service application to use the copy data.

BRIEF DESCRIPTION OF THE DRAWINGS

The figures depict embodiments for purposes of illustration only. One skilled in the art will readily recognize from the following description that alternative embodiments of the structures and methods illustrated herein may be employed without departing from the principles described herein.

DETAILED DESCRIPTION

As noted above, the use of business service applications continues to grow within enterprises, and production data from these business service applications is being used more and more within the enterprise beyond the original business service application. For the purpose of the present disclosure, the original business service application is referred to as the primary application, and another business service application that uses the production data from a primary application is referred to as a secondary application. Further, copies of the production data (e.g., physical or logical copies) for use in a secondary application is referred to herein as copy data.

The present disclosure provides systems and methods for automatically maintaining the security profile (also known as a "security envelope") for production data by automatically provisioning the security profile for the production data to secondary business service applications using copy data, and/or by automatically provisioning the security profile directly into the copy data, and/or by automatically provisioning the security profile to the computing environments running the secondary application, and/or by any combination of the above noted security provisioning processes.

It should be noted that software solutions for establishing security profiles for production data and enforcing such security profiles on the production data are known in the art. The components of a security profile may include individually or in combination, data access controls, data encryption and tokenization controls, anti-malware systems, host intrusion detection and/or intrusion prevention systems, network-based intrusion detection and/or intrusion prevention systems, firewall security controls, and other desired security policies intended to protect the production data from unauthorized access, theft, manipulation and/or corruption. These components can be implemented by deploying security software in a server that is running a primary application, and/or in a database server storing the production data, and/or by deploying known security software at the enterprise network level. Such security profile components can also be implemented in virtual servers and virtual storage servers.

Turning now to the provisioning system of the present disclosure, implementing security profile components on production data is established using an information provisioning orchestration system and a security orchestration system that informs an information fabric with information about the enterprise computing environment, including physical and virtual machines within the computing environment, primary applications within in the enterprise computing environment, production data associated with the primary applications, secondary applications within the computing environment, and any existing copy data within the computing environment.

Figure 1:
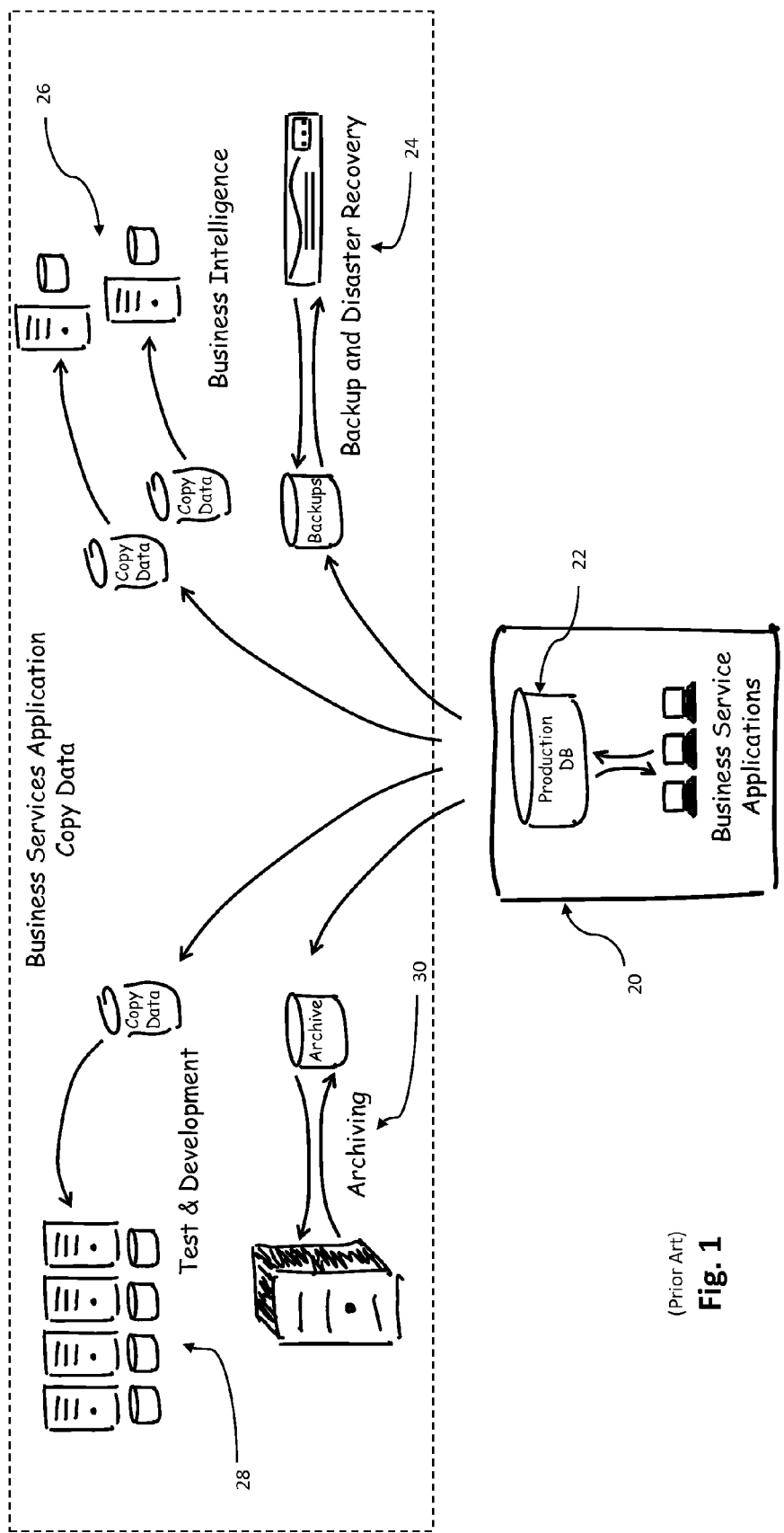
FIG. 1 is a block diagram illustrating a conventional copy data environment.
Figure 2:
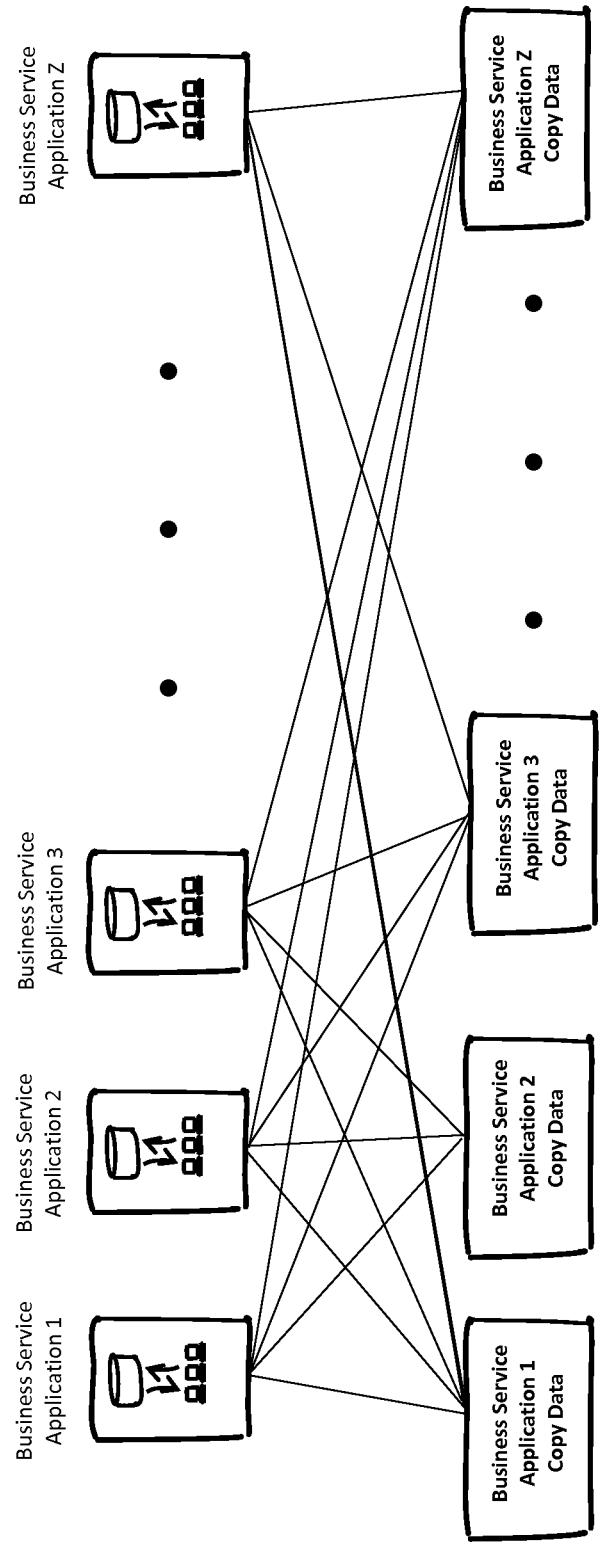
FIG. 2 is a block diagram illustrating copy data sprawl.
Figure 3:
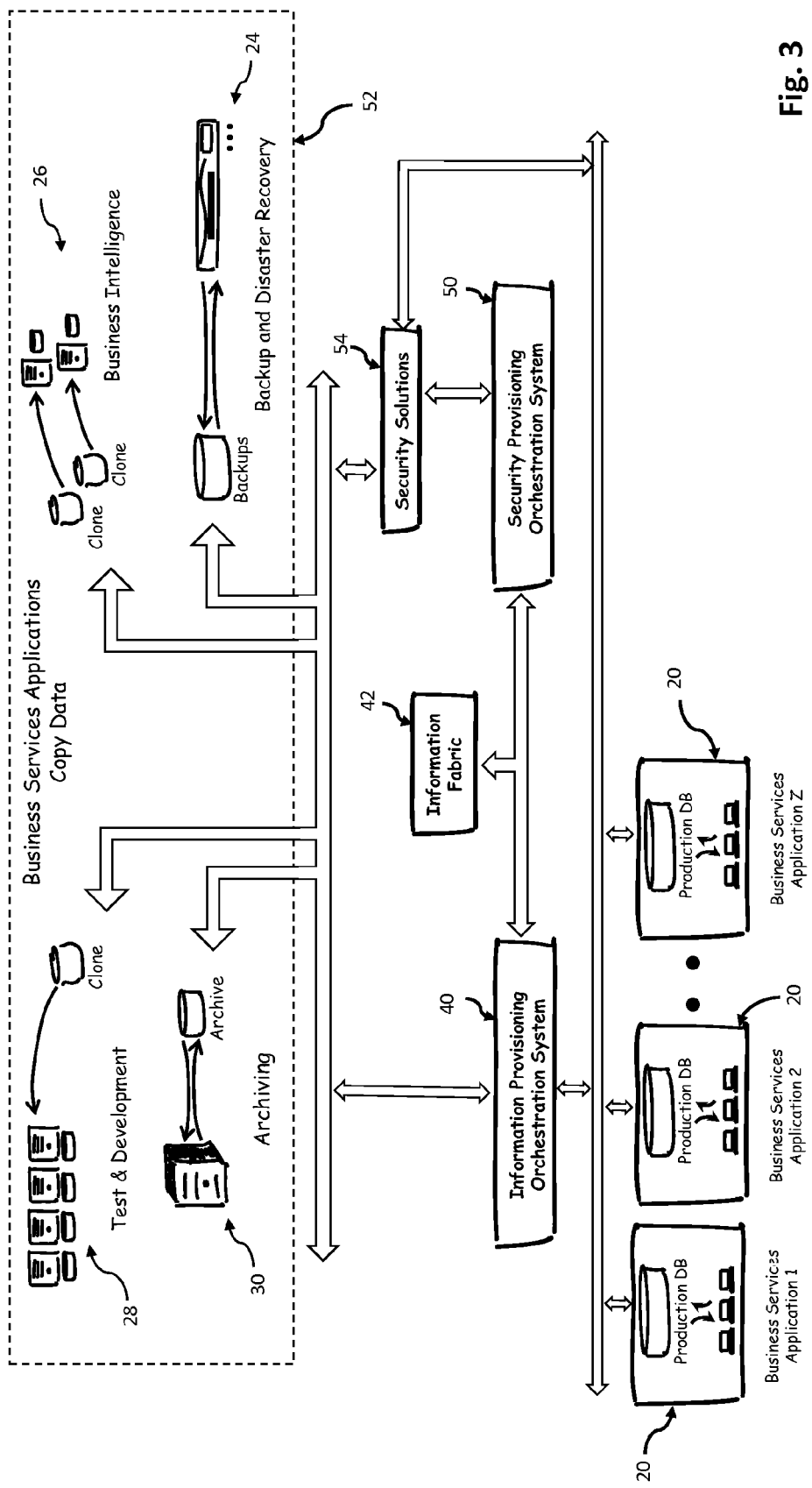
FIG. 3 is a block diagram of an exemplary embodiment of a copy data management environment with an information provisioning orchestration system and a security provisioning orchestration system according to the present disclosure.

As noted, with the expansion of copy data, the security profile of the production data needs to be provisioned or passed to or along with the copy data so that the copy data is secured at least at the same level that the production data is protected. To achieve this, an information provisioning orchestration system 40, an information fabric 42 and a security provisioning orchestration system 50 can be implemented between security solutions already used within an enterprise and the primary applications, as seen in FIG. 3. The information provisioning orchestration system 40, information fabric 42 and the security provisioning orchestration system 50 are positioned between 1 and Z primary applications 20 and primary applications copy data repositories 52 and work in tandem to provision copy data with a security profile that is at least the same level that the production data is protected.

The information provisioning orchestration system 40 continuously collects data and metadata about the enterprise computing environment, including data about physical and virtual machines within the computing environment, data about primary applications within the environment, data about production data within the environment, data about secondary applications within the environment, and data about existing copy data within the environment, and updates the information fabric 42 with any new information collected. The information provisioning orchestration system 40 also continuously collects data and metadata about the security profiles and provisioning associated with the primary application and production data within the enterprise computing environment, and updates the information fabric 42 with any new information collected. In addition, the information provisioning orchestration system 40 is used to allocate production data as copy data for use by a secondary application, in for example, a virtual machine.

As noted, security profiles related to the exporting or managing of production data are known, and each enterprise may have internal information security policies for primary applications that use or generate production data. The type of production data and the properties of the primary application using the production data influence the security provisioning for the production data. It should be noted that tools or solutions for implementing a security profile for production data are known in the art. For example, conventional security orchestration products, such as the Data Center Security Operations Director product offered by Symantec Corp., can be deployed to orchestrate the protection of the primary business service application and associated production data.

The information fabric is used as a basis for automated security provisioning by the security orchestration system 50 as will be described below. The information fabric 42 is a pre-established logical structure or store of data and metadata. The data is associated with the topology of the enterprise computing environment, including physical and virtual machines within the computing environment, primary applications within the environment, production data within the environment, secondary applications within the environment, and any existing copy data within the environment. The metadata includes information about individual instances of primary applications, production data and where it resides within the computing environment, secondary applications, and any existing copy data within the computing environment, and security metadata. The security metadata (or security attributes) includes information about the security profile of the primary applications and production data that is needed to properly protect the production data as per regulatory standards and internal IT information security policies, and information about security profiles provisioned for secondary applications and their associated copy data. In some instances the production data to be used by a secondary application may not be centrally located, such that the production data may reside in different computing and storage devices within the computing environment, or the production data may reside in other application services themselves. In such instances the production data may be considered as sets of data residing in different locations that together form the production data. Since each set of production data used as copy data for a secondary application may reside in a different computing or storage devices within the computing environment, each set of production data may have its own security metadata that will likely differ from the security metadata of the other sets of the production data. As a result, production data may have different security metadata associated with it.

Examples of security metadata include compliance related metadata, application positioning related security metadata, confidentiality related security metadata, secondary application diversity security metadata, and organizational ownership security metadata. Compliance related security metadata includes, security metadata related to regulatory standards within the scope of the production data, such PCI or HIPAA regulator standards. To illustrate, a primary application used for healthcare purposes may store private information about patient medical conditions and patient identity that is governed by certain governmental regulations, e.g., HIPPA regulations. As another illustration, a primary application that processes credit card payments and may store private banking and personal identifying information, such as social security numbers, about customers who use the credit cards that may be governed by certain governmental regulations, e.g., PCI regulations. In such instances, the computing environment running each type primary application and storing the associated production data may have different security technologies, controls, products in place, and security policy configurations to protect the production data.

Application positioning related security metadata includes data regarding whether the primary application and/or secondary application is public facing or private facing, and data regarding whether a specified component of the primary application and/or secondary application receives end user requests and therefore may be more vulnerable to exploits and breaches. Confidentiality related security metadata includes data regarding whether the primary application and/or secondary application should be run in certain secure networks of the computing environment. To illustrate, if a secondary application is to be a private facing application where the secondary application will be run internally within the enterprise computing environment and the copy data will be used by internal users, or the secondary application is running in a restricted area where very few people are allowed access, then the security metadata may include whether the web tier component of the application runs inside the firewall of the computing environment (which is sometimes call the "dmz"), or in certain secured networks, whether end users must be sign on to the internal corporate network. As another illustration, if a secondary application is to be a public facing application where the application and copy data are to be available on the internet for public use, then the security metadata may include conventional "public facing" metadata. For example, if the secondary application is public facing, then many people can attack the secondary application to get at the copy data, which means the secondary application will need to be in a computing environment configured for a higher security threat than a secondary application that is private facing.

Other security metadata may include metadata about the secondary application's diversity. More specifically, many of today's business service software applications have a complex structure where multiple processes may be running on multiple servers. A business service application with such a complex structure has different types of elements or modules, such as web services, application servers, and database servers, which may be running in different computing environments and provide different functionality. Security metadata about such a complex structure may include distinct tiers that make up the applications, which include web, application and database tiers that have different security metadata based on how easy they are to attack, and how sensitive the asset is.

Another set of security metadata may include metadata about the organization ownership. That is, which organization in the enterprise is responsible for the secondary application using the copy data, e.g. finance, human resources, or engineering. Knowing which organization owns the secondary application may drive security provisioning that needs to be deployed for the copy data, and where to deploy security products to meet the security provisioning requirements.

The security orchestration system 50 continuously collects metadata about the security profiles and provisioning associated with the primary application and production data and the secondary application and copy data within the enterprise computing environment, and updates the information fabric 42 with any new information collected. The security orchestration system 50 also includes a rules engine that analyzes data in the information fabric 42 and determines the security provisioning to implement for each logical copy of production data being made in the enterprise. More specifically, this rule engine in the security provisioning orchestration system 50 utilizes a set a rules, established by an enterprise system administrator, that analyzes security metadata within the information fabric associated with the production data to be copied.

Each security attribute detected by the rules engine determines the security provisioning needed for the copy data, secondary application and the secondary application's computing environment. An example of the security provisioning needed is; deploying a host-based or network security product in the secondary application computing environment, and a corresponding set of security policies to be invoked for such product. By knowing the security attributes of the primary application and the production data, the security provisioning orchestration system 50 can determine the security product or products that need to be running in the computing environment where the secondary application is to reside and where the copy data is to be stored, and the corresponding security policies to be configured on such product or products in order to protect the copy data with the same level of security the production data requires as per regulatory and internal IT information security policies.

The security provisioning orchestration system 50 can also automatically determine where in the enterprise licensed copies of the security product or products are stored, and automatically deploy the security products in the computing environment where the secondary application is running and configure security product or products in accordance with the derived security policies.

In this exemplary configuration of FIG. 3, when a request for a copy of production data is made to the information provisioning orchestration system 40, the system 40 would communicate with the security provisioning orchestration system 50 providing that security orchestration system 50 with information about the primary application, the production data to be copied, and the use of the production data. The security provisioning orchestration system 50 would then use the rules engine to analyze the information received from the information provisioning orchestration system 40 to determine the security provisioning needed for the secondary application using the copy data, and the computing environment running the secondary application. The information provisioning orchestration system 40 would then logically allocate the copy data in, for example, a virtual machine running the secondary application, and the security provisioning orchestration system 50 would automatically deploy any security product or products needed and configure the security product or products to effect the determined security provisioning for the copy data. In addition, the security provisioning orchestration system 50 would encrypt and tokenize specific data records and fields as per regulatory and internal IT information security policies. Finally, access control policies that restrict which end users are allowed to access this copy data applications are also deployed.

Thus, the information provisioning orchestration system 40, information fabric 42 and security provisioning orchestration system 50 work in tandem to analyze security metadata stored in the information fabric to determine a security profile that needs to be provisioned for secondary applications that use the copy data, the copy data and the computing environment running the secondary application. Once the security profile is ascertained, the security provisioning orchestration system determines the security software needed to implement the security polices implied by the security profile, and configures the security software to enforce the security profile for the copy data. For example, the security provisioning orchestration system determines what security product or products need to be deployed in the computing environment in which the secondary application will be running, and what security policies need to be configured in these security products in order to protect the copy data and the computing environment running the secondary application, and to protect the secondary application. An example of a security product for a primary application may be host based security controls, such as host-based intrusion detection and/or intrusion prevention system controls. An example of host-based intrusion detection and/or intrusion prevention system controls is the Data Security Center: Server Advanced product offered by Symantec Corp. That security product may be configured to protect the processes that make up the primary application. A firewall may be configured to control network traffic to allowed subnets and endpoints. Encryption may be enforced on all the storage volumes used by this primary application, and end user access may be restricted to a small subset of users, such as members of the finance team based on corporate directory memberships.

Figure 4:
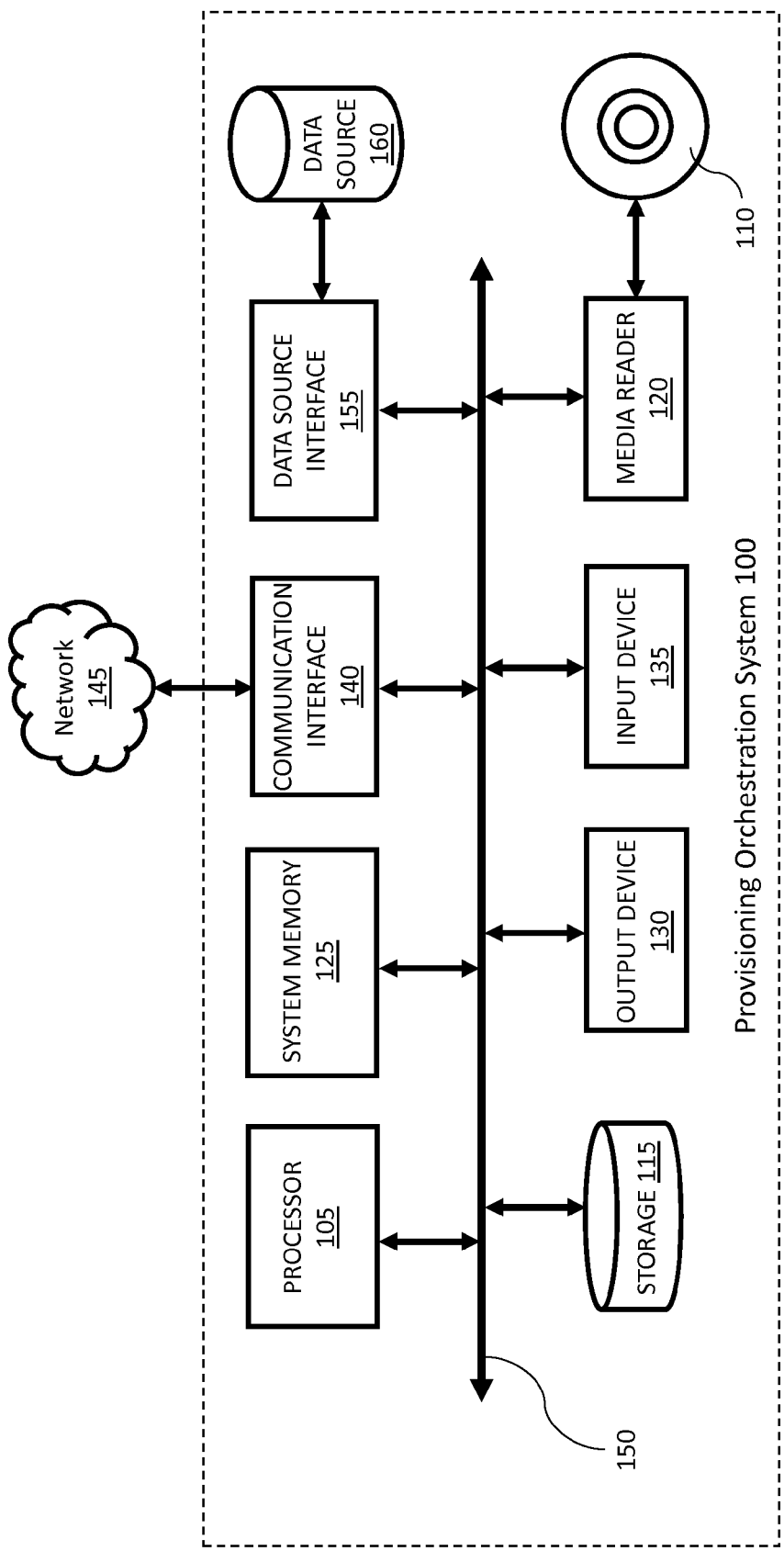
FIG. 4 is a block diagram of an exemplary embodiment of a computing environment for the information provisioning orchestration system and the security provisioning orchestration system according to the present disclosure.

FIG. 4 is a block diagram of an exemplary embodiment of computing system 100 that can execute the program code comprising the information provisioning orchestration system 40 and the security provisioning orchestration system 50. In this exemplary embodiment, the computing system 100 is interconnected via a bus 150. The system 100 includes a processor 105 that executes software instructions or code stored on, for example, a computer readable storage medium 110 or stored in system memory 125, e.g., random access memory, or storage device 115, to perform the information provisioning and security provisioning disclosed herein. The processor 105 can include a plurality of cores.

The exemplary system 100 of FIG. 4 may also include a media reader 120 to read the instructions from the computer readable storage medium 110 and store the instructions in storage device 115 or in system memory 125. The storage device 115 provides storage space for retaining static data, such as program instructions that could be stored for later execution, or the information fabric directory to be discussed herein below. Alternately, with in-memory computing devices or systems or in other instances, the system memory 125 would have sufficient storage capacity to store much if not all of the data and program instructions used for the information provisioning and security provisioning disclosed herein, instead of storing the data and program instructions in the storage device 115. Further, the stored instructions may be further compiled to generate other representations of the instructions and dynamically stored in the system memory 125. In either embodiment, the processor 105 reads instructions from the storage device 115 or system memory 125, and performs actions as instructed.

The system 100 may also include an output device 130, such as a display, to provide visual information to users, and an input device 135 to permit users or another devices to enter data into and/or otherwise interact with the security provisioning orchestration system 100. One or more of the output or input devices could be joined by one or more additional peripheral devices to further expand the capabilities of the system 100 as is known in the art.

A communication interface 140 is provided to connect the system 100 to a network 145 and in turn to other devices connected to the network 145, including other clients, servers, data stores, and interfaces. A data source interface 155 provides access data source 160, e.g. an information resource, typically via one or more abstraction layers, such as a semantic layer, implemented in hardware or software. For example, the data source 160 may be accessed by network 145. Data sources include sources of data that enable data storage and retrieval. Data sources may include databases, such as, relational, transactional, hierarchical, multi-dimensional (e.g., OLAP) databases, object oriented databases, and the like.

Figure 5:
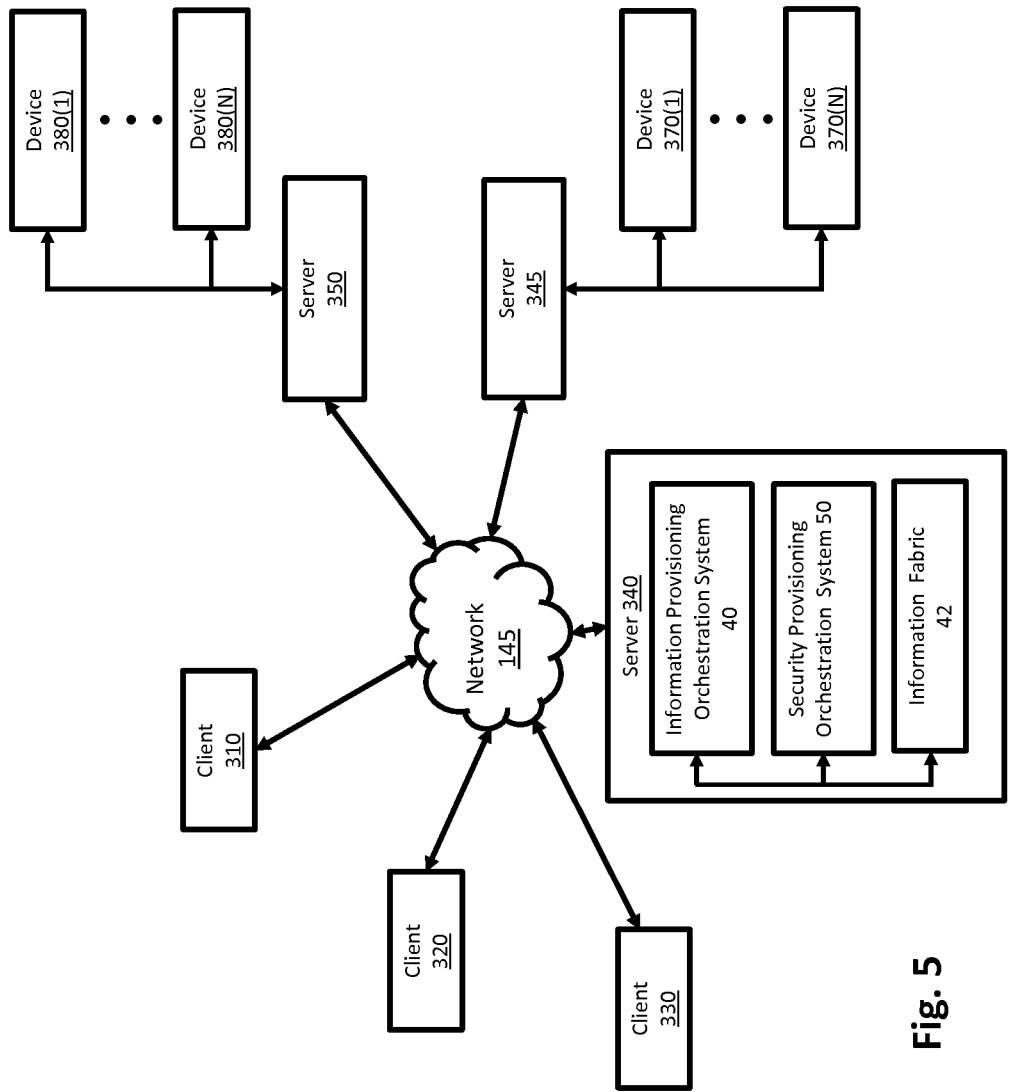
FIG. 5 is a block diagram of another exemplary enterprise computing environment implementing the information provisioning orchestration system and the security orchestration system according to the present disclosure.

Referring to FIG. 5, a block diagram of an exemplary network architecture 300 for the computing environment is shown. The network architecture 300 includes client systems 310, 320, and 330 and servers 340, 354 and 350 coupled to a network 145. In the exemplary embodiment of FIG. 5, the information provisioning orchestration system 40, information fabric 42 and security provisioning orchestration system 50 of the present disclosure are loaded into server 340. However, the provisioning orchestration systems and information fabric may be loaded into any client system or server connected to the network 145. Client systems 310, 320, and 330 can be any type or form of computing device or system. Similarly, servers 340, 345 and 350 can be computing devices or systems, such as application servers or database servers, configured to provide various database services and/or run certain primary or secondary business service software applications. As noted above, network 145 can be any telecommunication or computer network including, for example, an intranet, a wide area network (WAN), a local area network (LAN), a personal area network (PAN), or the Internet.

As illustrated in FIG. 5, one or more storage devices 370(1)-(N) may be directly attached to server 345. Similarly, one or more storage devices 380(1)-(N) may be directly attached to server 350. Storage devices 370(1)-(N) and storage devices 380(1)-(N) can be any type or form of storage device or medium capable of storing production or copy data and/or computer-readable instructions. In certain embodiments, storage devices 370(1)-(N) and storage devices 380(1)-(N) may represent network-attached storage (NAS) devices configured to communicate with servers 345 and 350 using various protocols, such as NFS, SMB, or CIFS.

In certain embodiments, and with reference to the exemplary server 200 of FIG. 4, a communication interface, such as communication interface 140, may be used to provide connectivity between each client systems 310, 320, and 330 and network 145. Client systems 310, 320, and 330 may be able to access information on server 340, 345 or 350 using, for example, a web browser or other client software. Such software may allow client systems 310, 320, and 330 to access data hosted by server 340, server 350, storage devices 370(1)-(N), and storage devices 380(1)-(N).

Figure 6:
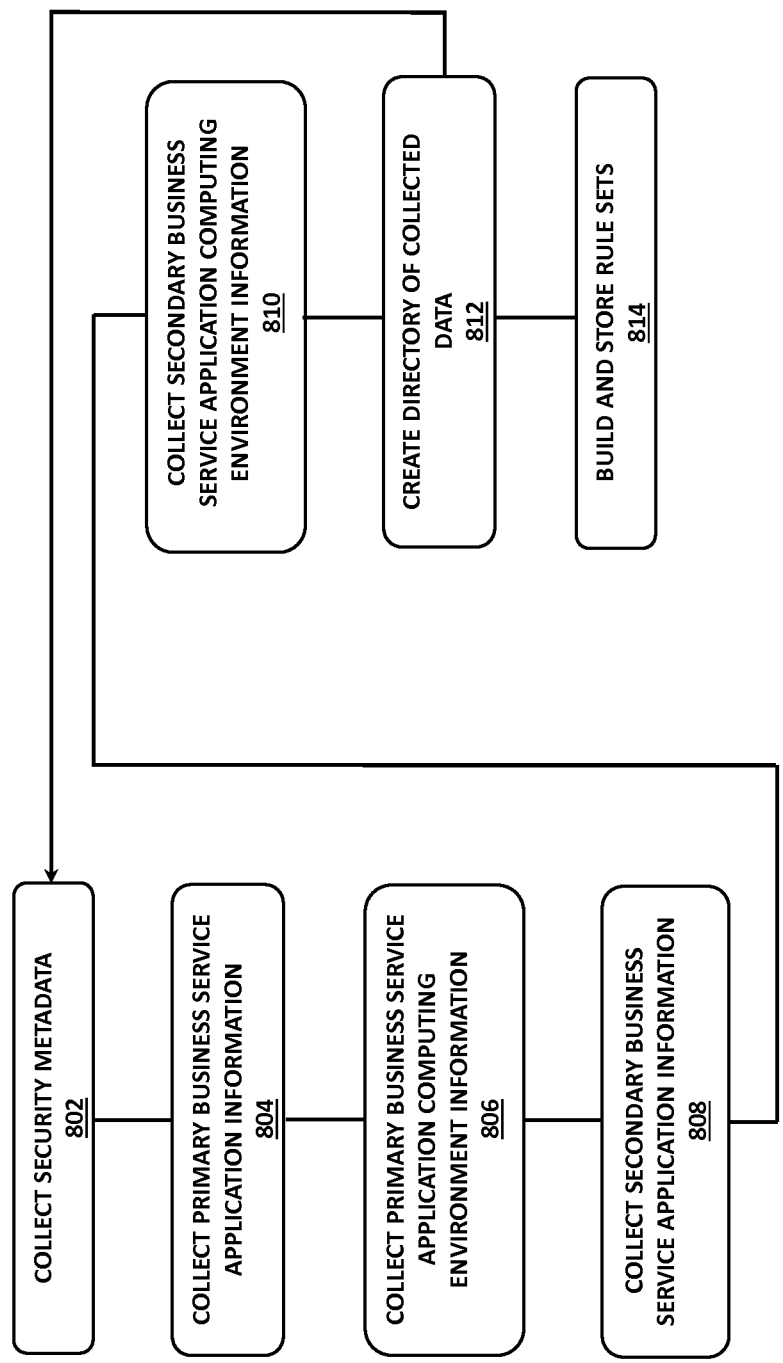
FIG. 6 is a flow diagram for informing an information fabric according to the present disclosure.
Figure 7:
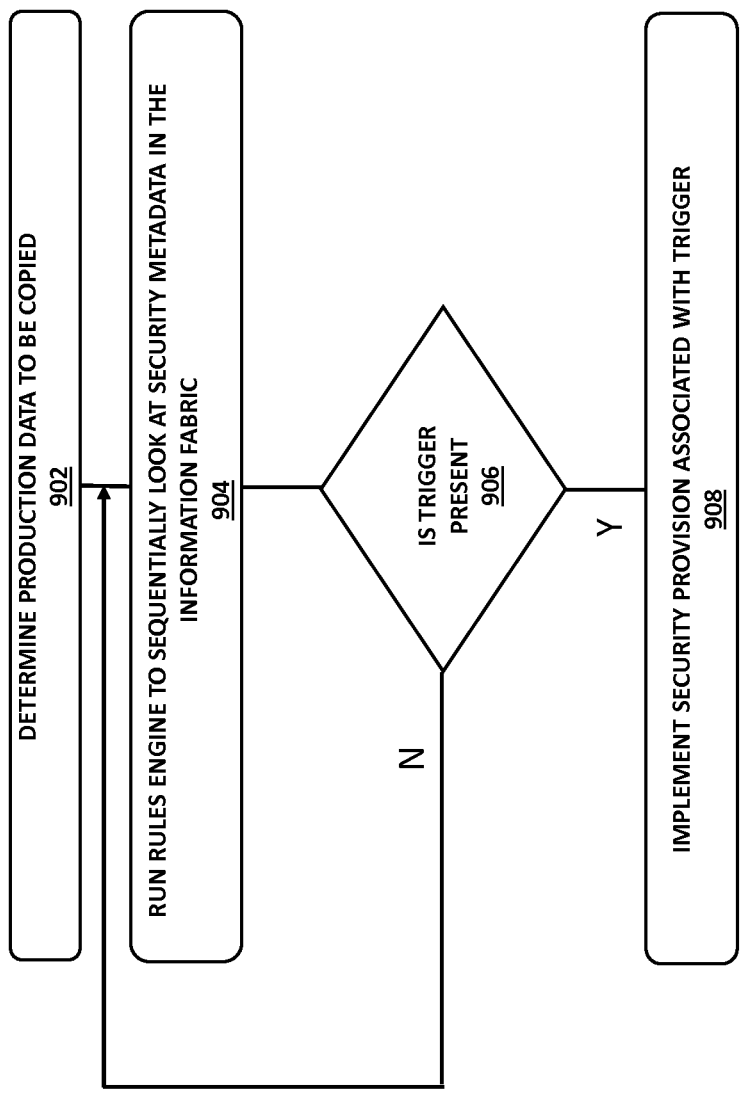
FIG. 7 is a flow diagram for security provisioning according to the present disclosure.

Turning now to FIGS. 6 and 7 an exemplary embodiment of the process for automated security provisioning is provided. In this embodiment, the information provisioning orchestration system 40 and the security provisioning orchestration system 50 initially informs the information fabric 42 with data and metadata, as described above. The information fabric 42 is then regularly updated by the information provisioning orchestration system 40 and other sources of metadata including the security provisioning orchestration system 50.

To inform the information fabric 42, the information provisioning orchestration system 40 and the security provisioning orchestration system 50 collects data and metadata related to the production data (at step 802), collects information about the primary application (at step 804), collects information about the computing environment running primary application (at step 806), collects information about the secondary application (at step 808), and collects information about the computing environment running secondary application (at step 810).

The information fabric is informed by updating the information fabric store with the data collected for the copy data security profile (at step 812). The information fabric is dynamic and keeps track of the production data, copy data, primary and secondary applications, and the security metadata and security controls that are deployed for the production and copy data and the primary and secondary applications.

As noted above, the information fabric is used to determine which security metadata are to be applied to the copy data and secondary application when the secondary application is launched, and which security controls are to be deployed and configured in the computing environment running the secondary application. Based on the security metadata in the information fabric, a security administrator establishes one or more sets of rules (at step 814) that use the security metadata in the information fabric and stores the rules in a storage device, e.g., storage 115. The rules may be new rules, or pre-existing rules may be copied for the security provisioning orchestration system rules engine. The sets of rules are similar to rules used for a rules based engine, where a number of IF-THEN statements are structured so that "if" a condition or trigger is present "then" the following event or result occurs, are organized in a serial fashion. An example of such a rule is; if data is in scope of HIPAA regulations, and data access must be granted to additional groups within the enterprise then patient identifier in the data must be tokenized. Additional rules may include the deployment of host-based security and activity monitoring security controls for the copy data application.

Turning to FIG. 7, an exemplary method for data security provisioning will be described. Initially, when a copy of production data is to be created, the information provisioning orchestration system 40 determines what production data is to be made available as copy data, allocates the copy data for use by the secondary application, and provides information about the production data, the primary application, the computing environment, the secondary application, and the copy data to the security provisioning orchestration system 50. The rules engine in the security provisioning orchestration system 50 would then sequentially look at the security metadata in the information fabric associated with the production data to be copied, at step 904, and if the condition or trigger is present, at step 906, then the security provisioning orchestration system 50 would respond by taking the action defined in the rule, at step 908. For example, if a rule states—if security metadata payment card industry (PCI) standard is present, then perform the following processes, e.g., deploy one or more security software products in the secondary computing environment to be used to run the secondary application using the copy data and configure the one or more security software products in accordance with the appropriate policy. In other words, when the security provisioning orchestration system sees certain security metadata associated with the production data (based on queries into the information fabric), the security provisioning orchestration system 50 automatically orchestrates security solutions 54 to provision the right security software and policies into the copy data, the secondary business service application and/or the computing system running the secondary business services application.

The security provisioning orchestration system 50 is also capable of standing-up a security product in that it can cause the security solutions 54 to push security software to the secondary business service application and/or the computing system running the secondary business services application, and push the security policies to the security product. It should be noted that security software products enforce the security policies they are configured with. For example, if the security policy is to tokenize patient names, then the security software products would implement the tokenization of names. The security provisioning orchestration system 50 can also work with network based security controls in, for example, the server 340 seen in FIG. 5 to ensure that security provisioning for network security can be downloaded and installed in the network, and to push the security provision policies to the network security products.

An example of security provisioning according to the present disclosure, will be described using production data that is healthcare data. In this example, the security provisioning may be to impose a rule where "if" the production data is healthcare data, "then" all secondary applications using the copy data cannot provide users with access to the names of patients. To achieve this security provisioning, the security provisioning orchestration system 50 may tokenize the patient name information in the copy data such that a secondary application using the copy data cannot access the patient name information, or the security provisioning orchestration system 50 may impose a policy in the security product where access to patient name information would be denied to users of the secondary application.

Another example of security provisioning according to the present disclosure, using production data that is healthcare data will be described. In this example, the security provisioning may be to impose a rule where "if" the production data is healthcare data, "then" certain employees using secondary applications using the copy data can have access to patient names. To achieve this security provisioning, the security provisioning orchestration system 500 may impose a policy in the security product to only allow access to patient name information to the certain employees and all other users of the secondary application would be denied access to patient name information.

Using the above-identified security provisioning, an enterprise can ensure that each logical copy of production data (i.e., copy data) automatically has the security profile of the original production data. It should be noted that each version of copy data with the security provisioning is properly labeled as copy data with the defined security profile.

Each new secondary business service application that is to use copy data can be automatically provisioned with the security profile of each copy data set so that the security profile for all copies of production data to be used by the each secondary application will be imposed on each new secondary application and enforced by the security products installed to enforce the security policies. This automation process enable consistent and reliable security management of copy data.

The security provisioning automation according to the present application can also be deployed in cloud computing based platforms, such as the Amazon web services (AWS) platform. The security orchestration system according to the present disclosure can orchestrate the set of controls that can be successfully deployed and made available on the AWS IaaS platform.

While the foregoing disclosure sets forth various embodiments using specific block diagrams, flow diagrams, and examples, each block diagram component, flow diagram step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

Process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. It should be noted that the security profile of the production data contemplated by the present disclosure may include any other security functions that regulate data access control, implement data security measures, such as masking or tokenizing the copy data, or otherwise enforce data security policies, such a encrypting the copy data to prevent access by individuals outside the enterprise.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

What is claimed is:

1. A computer-implemented method for automating security provisioning for copy data, at least a portion of the method being performed by a computing system comprising at least one computer processor, the method comprising:
   identifying production data associated with a primary application operating in an enterprise computing environment;
   determining that a logical copy of the production data associated with the primary application is to be used for a secondary application operating within a virtual machine of the enterprise environment;
   identifying a security orchestration system that maintains an enterprise rules engine, wherein:
      the enterprise rules engine utilizes a set of enterprise security rules to determine, based on security metadata in an information fabric, security provisioning to implement for logical copies of production data within the enterprise computing environment; and
      the information fabric receives the security metadata from an information provisioning orchestration system that continually collects data and metadata about the enterprise computing environment, wherein the security metadata is based on the continually collected data and metadata;
   using the security orchestration system to identify, from the set of enterprise security rules, an enterprise security rule indicating a level of security, required for the production data associated with the primary application, that needs to be provisioned for secondary applications that use logical copies of the production data; and
   in response to identifying the enterprise security rule, implementing a security provisioning action set forth in the enterprise security rule such that the production data associated with the primary application and the logical copy of the production data are protected with the same level of security, wherein the security provisioning action comprises:
      allocating, for the secondary application, the logical copy data in the virtual machine; and
      at least one of:
         automatically deploying one or more security products in the virtual machine to effect the identified level of security; and
         automatically configuring one or more security products in the virtual machine to effect the identified level of security.

2. The method according to claim 1, wherein the security metadata includes metadata about network positioning of the secondary application.

3. The method according to claim 2, wherein the network positioning is private facing such that the secondary application runs internally within an enterprise associated with the secondary application.

4. The method according to claim 2, wherein the positioning of the secondary application is public facing such that the secondary application is available on the internet for public use.

5. The method according to claim 1, wherein:
   determining that the logical copy of the production data is to be used for the secondary application comprises determining that the information provisioning orchestration system has received a request to allocate the logical copy of the production data for use by the secondary application;
   using the security orchestration system to identify the enterprise security rule comprises using the security orchestration system to identify the enterprise security rule in response to determining that the information provisioning orchestration system has received the request; and
   the information provisioning orchestration system implements the security provisioning action set forth in the enterprise security rule as part of allocating the logical copy of the production data for use by the secondary application.

6. The method according to claim 1, wherein:
an enterprise associated with the enterprise computing environment comprises a plurality of organizations that operate within the enterprise; and
the security metadata includes at least one of:
  metadata about an organization within the enterprise responsible for the secondary application; and
  metadata about an organization within the enterprise responsible for the primary application.

7. The method according to claim 1, wherein:
at least one of the primary application and the secondary application comprises a complex structure that includes a plurality of processes running on a plurality of servers; and
the security metadata includes metadata about diversity associated with at least one of the primary application and the secondary application that describes the complex structure of at least one of the primary application and the secondary application.

8. The method according to claim 1, wherein the security provisioning action further comprises initiating the setting of security policies in security software running in the secondary application.

9. The method according to claim 1, wherein the secondary application represents at least one of:
a data science application using the logical copy of the production data to test applications in a test and development environment;
a business intelligence application intending to perform services on the production data;
a disaster recovery application using the logical copy of the production data to enable retrieval of the production data in the event of a disaster associated with a primary computing environment of the production data;
an application using the logical copy of the production data for archiving purposes; and
an application using the logical copy of the production data for auditing purposes.

10. The method according to claim 1, wherein the security metadata includes metadata about organization ownership.

11. A system for automating security provisioning for copy data, the system comprising:
an information fabric, stored in memory, containing security metadata associated with production data used by a primary application operating in an enterprise computing environment, wherein:
  the information fabric receives the security metadata from an information provisioning orchestration system that continually collects data and metadata about the enterprise computing environment;
  the security metadata is based on the continually collected data and metadata;
a security orchestration system, stored in memory, that:
  maintains an enterprise rules engine that utilizes a set of enterprise security rules to determine, based on the security metadata in the information fabric, security provisioning to implement for logical copies of production data within the enterprise computing environment;
  determines that a logical copy of the production data is to be used for a secondary application operating within a virtual machine of the enterprise computing environment;
  identifies, from the set of enterprise security rules, an enterprise security rule indicating a level of security, required for the production data associated with the primary application, that needs to be provisioned for secondary applications that use logical copies of the production data; and
  in response to identifying the enterprise security rule, implements a security provisioning action set forth in the enterprise security rule such that the production data associated with the primary application and the logical copy of the production data to be used for the secondary application are protected with the same level of security, wherein the security provisioning action comprises:
    allocating, for the secondary application, the logical copy data in the virtual machine; and
    at least one of:
      automatically deploying one or more security products in the virtual machine to effect the identified level of security; and
      automatically configuring one or more security products in the virtual machine to effect the identified level of security; and
at least one physical processor configured to execute the information fabric and the security orchestration system.

12. The system according to claim 11, wherein the security metadata includes metadata about a network positioning of the secondary application.

13. The system according to claim 12, wherein the network positioning of the secondary application is private facing such that the secondary application runs internally within an enterprise associated with the enterprise computing environment.

14. The system according to claim 12, wherein the network positioning of the secondary application is public facing such that the secondary application is available on the internet for public use.

15. The system according to claim 11, wherein:
at least one of the primary application and the secondary application comprises a complex structure that includes a plurality of processes running on a plurality of servers; and
the security metadata includes metadata about diversity associated with at least one of the primary application and the secondary application that describes the complex structure of at least one of the primary application and the secondary application.

16. The system according to claim 11, wherein:
an enterprise associated with the enterprise computing environment comprises a plurality of organizations that operate within the enterprise; and
the security metadata includes at least one of:
  metadata about an organization within the enterprise responsible for the secondary application; and
  metadata about an organization within the enterprise responsible for the primary application.

17. The system according to claim 11, wherein the security metadata includes metadata about organization ownership.

18. The system according to claim 11, wherein the security provisioning action further comprises initiating the setting of security policies in security software running in the secondary application.

19. The system according to claim 11, wherein the security provisioning action further comprises encrypting at least one of data records and fields indicated in the security metadata.

20. A non-transitory computer-readable medium comprising one or more computer-readable instructions that, when executed by at least one processor of a computing device, cause the computing device to:

identify production data associated with a primary application operating in an enterprise computing environment;

determine that a logical copy of the production data is to be used for a secondary application operating within a virtual machine of the enterprise environment;

identify a security orchestration system that maintains an enterprise rules engine, wherein:

the enterprise rules engine utilizes a set of enterprise security rules to determine, based on security metadata in an information fabric, security provisioning to implement for logical copies of production data within the enterprise computing environment; and the information fabric receives the security metadata from an information provisioning orchestration system that continually collects data and metadata about the enterprise computing environment, wherein the security metadata is based on the continually collected data and metadata;

use the security orchestration system to identify, from the set of enterprise security rules, an enterprise security rule indicating a level of security, required for the production data associated with the primary application, that needs to be provisioned for secondary applications that use logical copies of the production data; and in response to identifying the enterprise security rule, implement a security provisioning action set forth in the enterprise security rule such that the production data associated with the primary application and the logical copy of the production data are protected with the same level of security, wherein the security provisioning action comprises:

allocating, for the secondary application, the logical copy data in the virtual machine; and at least one of:

automatically deploying one or more security products in the virtual machine to effect the identified level of security; and automatically configuring one or more security products in the virtual machine to effect the identified level of security.

* * * * *